(12) United States Patent
Seigneur et al.

(10) Patent No.: US 11,358,842 B2
(45) Date of Patent: Jun. 14, 2022

(54) THRUST CHAIN DEVICE

(71) Applicant: SERAPID—FRANCE, Rouxmesnil Bouteilles (FR)

(72) Inventors: Ivan Seigneur, Dieppe (FR); Alexandre Debeauvais, Petit caux (FR)

(73) Assignee: SERAPID—FRANCE, Rouxmesnil Bouteilles (FR)

( * ) Notice: Subject to any disclaimer, the term of this patent is extended or adjusted under 35 U.S.C. 154(b) by 383 days.

(21) Appl. No.: 16/473,001

(22) PCT Filed: Jan. 8, 2018

(86) PCT No.: PCT/FR2018/050036
§ 371 (c)(1),
(2) Date: Jun. 24, 2019

(87) PCT Pub. No.: WO2018/130769
PCT Pub. Date: Jul. 19, 2018

(65) Prior Publication Data
US 2019/0322501 A1 Oct. 24, 2019

(30) Foreign Application Priority Data

Jan. 10, 2017 (FR) ...................................... 1750216

(51) Int. Cl.
*B66F 3/06* (2006.01)
*F16G 13/07* (2006.01)
(Continued)

(52) U.S. Cl.
CPC ................ *B66F 3/06* (2013.01); *F16G 13/07* (2013.01); *F16G 13/20* (2013.01); *F16H 19/0636* (2013.01)

(58) Field of Classification Search
CPC ...... F16H 19/0636; F16G 13/20; F16G 13/07; B66F 3/06
See application file for complete search history.

(56) References Cited

U.S. PATENT DOCUMENTS 3,665,704 A * 5/1972 Trudeau .................. F16G 13/07
59/85
8,250,846 B2 * 8/2012 Soerensen ............... F16G 13/20
59/78
(Continued)

FOREIGN PATENT DOCUMENTS

DE 2251307 5/1974
DE 102014007458 11/2015
(Continued)

OTHER PUBLICATIONS

International Search Report for PCT/FR2018/050036 dated Apr. 10, 2018, 4 pages.

*Primary Examiner* — David M Fenstermacher
(74) *Attorney, Agent, or Firm* — Dority & Manning, P.A.

(57) ABSTRACT

A thrust chain device that induces an open thrust chain with a thrust portion and a housing portion, a thrust chain guide on a thrust portion of the thrust chain, a driving sprocket provided with teeth interlocking with the thrust chain, and a storage space of the housing portion, is provided. The storage space is parallel to the thrust portion and located opposite the thrust portion, the driving sprocket interlocks bilaterally with the thrust chain in a symmetric manner on the side of the thrust portion and on the side of the housing portion, the chain includes a connection portion between the thrust portion and the housing portion, arranged at a distance from the sprocket, the driving sprocket is in contact with the thrust chain by surfaces in the shape of an involute of a circle, the surfaces belonging to the teeth, where one tooth meshes with the chain while defining a line of action having an angle with the thrust portion between −10° and 10°, and the guide includes contact surfaces in synthetic material.

16 Claims, 6 Drawing Sheets

(51) Int. Cl.
 *F16G 13/20* (2006.01)
 *F16H 19/06* (2006.01)

(56) References Cited

U.S. PATENT DOCUMENTS

| | | | | |
|---|---|---|---|---|
| 8,336,286 B2* | 12/2012 | Veltrop | ................... | F16G 13/20 |
| | | | | 59/78 |
| 8,376,193 B2* | 2/2013 | Veltrop | ............... | B05C 17/0113 |
| | | | | 222/392 |
| 8,453,994 B2* | 6/2013 | Suko | ........................ | B66F 3/06 |
| | | | | 254/358 |
| 8,490,284 B2* | 7/2013 | Huang | ................... | F16H 55/08 |
| | | | | 29/893.35 |
| 8,695,320 B2* | 4/2014 | Scolari | ................... | F16G 13/20 |
| | | | | 59/78 |
| 9,217,497 B2* | 12/2015 | Huang | ................... | F16G 13/20 |
| 9,657,810 B2* | 5/2017 | Koschig | ................. | F16G 13/04 |
| 9,897,180 B2* | 2/2018 | Hartinger | ............ | F16H 19/0645 |
| 9,970,517 B2* | 5/2018 | Irwin | ........................ | E05D 3/04 |
| 10,053,930 B2* | 8/2018 | Marsh | ...................... | E21B 7/02 |
| 10,139,041 B2* | 11/2018 | Raabe | ................ | F16M 11/2085 |
| 2009/0008615 A1 | 1/2009 | Young et al. | | |
| 2014/0087903 A1 | 3/2014 | Maeda | | |

FOREIGN PATENT DOCUMENTS

| | | |
|---|---|---|
| EP | 2700844 | 2/2014 |
| JP | H0429660 | 1/1992 |
| JP | H1179349 | 3/1999 |
| JP | 2001088549 | 4/2001 |
| WO | WO2005108821 | 11/2005 |

\* cited by examiner

THRUST CHAIN DEVICE

CROSS REFERENCE TO RELATED APPLICATIONS

This application is the U.S. National Stage entry of International Application Number PCT/FR2018/050036 filed under the Patent Cooperation Treaty having a filing date of Jan. 8, 2018, which claims priority to French Patent Application Number 1750216 having a filing date of Jan. 10, 2017, which are incorporated herein by reference.

BACKGROUND

The invention relates to machinery for moving loads by thrust, and more specifically the transmission assemblies used in such machinery.

In domains where the movement of large loads over large distances is required but where the available space is limited, it is known to use chain machinery known as rigid chains. FR 2786476, filed by the present applicant, describes an articulated load-lifting column using a rigid chain.

Articulated-bar or rigid-chain machinery is used to move a chain to switch said chain from a folded state in which the chain occupies limited space to a deployed state in the form of a rigid rectilinear structure capable of withstanding high compression loads.

Compared with cylinder, arm or pantograph systems, a rigid chain is smaller in the folded state for deployment over long distances.

Rigid chain machinery is for example used in the entertainment industry to move decorative or scenic elements over significant distances at high speeds. This type of machinery can also be used in production industries, for example the mass production of high-weight products.

The operating range of rigid chains can be adapted to the usage environment by changing the number of links in the chain.

The existing machinery placed on the market by the present applicant is satisfactory. However, to enable this technology to penetrate new markets by replacing other more polluting and more cumbersome technology, the present applicant has identified a need for long, high-speed, low-noise thrust chains requiring infrequent maintenance.

The invention is intended to improve the situation.

SUMMARY

The present application proposes a thrust chain device, comprising an open thrust chain comprising a thrust portion and a housing portion, a thrust chain guide on a thrust portion of said thrust chain, a driving sprocket provided with teeth engaged with the thrust chain, and a storage space of the housing portion. Said storage space is parallel to the thrust portion and arranged opposite the thrust portion. The driving sprocket engages bilaterally and symmetrically with the thrust chain on the side of said thrust portion and on the side of the housing portion. The chain has a connection portion between the thrust portion and the housing portion, arranged at a distance from the sprocket. The driving sprocket is in contact with the thrust chain by circular-involute surfaces, said surfaces belonging to the teeth, in which a tooth meshing with the chain defines a line of action having an angle with the thrust portion of between −10° and 10°. Said guide comprises contact surfaces made of synthetic material.

Such a device is useful for lifting variable loads. Maintenance can be reduced to a minimum.

Such a transmission assembly makes it possible to apply forces to the chain in which the resultant is better aligned with the direction of translational movement of the chain. The components of the forces transmitted from the gear wheel to the chain other than the force of the direction of translational movement of the chain are rendered negligible. The energy efficiency of the transmission is significantly greater than the energy efficiency of known transmissions. Performance is improved. In addition to reducing the energy lost, the mechanical stresses applied to the transmission assembly and to the installation are also reduced. In particular, the members guiding the chain are less stressed. As a result, with all other features being equal, the transmission assembly defined above makes it possible to build installations in which the vibration, wear and noise in operation are considerably less than in known installations.

In one embodiment, said contact surfaces are rolling surfaces.

In one embodiment, said contact surfaces are sliding surfaces.

In one embodiment, there is only one driving sprocket. The driving sprocket can have one or more rows of teeth.

In one embodiment, at least one of the thrust portion and the housing portion is arranged above the sprocket, and the connection portion is arranged beneath the sprocket. Minimal space is occupied in the sprocket zone. In the case of vertical assembly, the thrust portion and the housing portion are arranged above the sprocket. In the case of oblique assembly, the thrust portion is arranged above the sprocket and a play take-up member may be added.

In one embodiment, the connection portion is free. The connection portion hangs beneath the sprocket, and therefore the shape thereof is determined by the length of the links and the number of links.

In one embodiment, the connection portion is guided by a return member. The return member has a profile distinct from a circular arc. Testing has revealed that a specific profile improved performance, notably in terms of noise.

In one embodiment, the return member is an approximate involute of a circle. The involute of a circle enables the detailed geometry of the parts to be taken into account.

In one embodiment, the return member is static. The device is simple to assemble.

In one embodiment, the position of the return member is adjustable. Adjustment to final positioning can be carried out on commissioning.

In one embodiment, the return member includes a tensioner.

In one embodiment, the return member includes a compressing member.

In one embodiment, the sprocket has between 5 and 15 straight teeth. This number of teeth makes it possible to ensure good continuity of movement between the gearwheel and the chain, to prevent uncontrolled movements when moving from one tooth to another, and to limit the related vibrations and noise.

In one embodiment, the sprocket has straight teeth with a module of between 3 and 64 mm.

In one embodiment, the chain has links articulated with one another by bars. The bar is mounted idly on the links of the chain. Rolling between the gearwheel and the bars is facilitated in terms of friction. Wear caused during use of the transmission assembly is reduced.

In one embodiment, at least one of the bars has a substantially cylindrical body and at least one ring arranged freely in rotation about the body in order to form a guide roller and/or drive roller for the chain. The rollers then act as wear parts and can be replaced quickly and easily during maintenance operations without entirely disassembling the chain, which reduces maintenance costs.

In one embodiment, the axis of rotation of the sprocket is horizontal when in operation.

In one embodiment, the thrust portion is rectilinear.

In one embodiment, the chain has a pre-tensioned elastic member.

In one embodiment, the line of action forms an angle of between −2° and 2° with the thrust portion.

In one embodiment, the guide has a first straight portion corresponding to the thrust portion, a second straight portion corresponding to the housing portion and a curved portion corresponding to the connection portion, and offers a rolling surface oriented outwards, the curved portion being convex, the curved portion being smoothly connected to the first straight portion at one end and to the second straight portion at the other end, the curved portion forming a return member, the curved portion having a non-constant radius and extending over 180°.

In one embodiment, the curved portion is symmetrical about the plane passing through the axis of the driving sprocket and the axis of the thrust portion and is made up of four identical quadrants, each quadrant is symmetrical about a plane at 45° to the plane passing through the axis of the driving sprocket and the axis of the thrust portion and parallel to the axis of the thrust portion, each quadrant having an upper rectilinear zone that extends the first straight portion or the second straight portion, a lower rectilinear zone that extends the lower rectilinear zone of the other quadrant and is in the plane passing through the axis of the driving sprocket and normal to the axis of the thrust portion, and a rounded zone between the upper rectilinear zone and the lower rectilinear zone.

In one embodiment, the curved portion has two circular arc portions of the same radius with offset centers, separated horizontally from one another, the radius being less than half of the distance between the two upper rectilinear zones.

In one embodiment, the guide forms a rolling surface for guide rollers.

In one embodiment, the curved portion includes a plurality of circular arc portions, said portions being tangents.

BRIEF DESCRIPTION OF THE DRAWINGS

Other features, details and advantages of the invention are set out in the detailed description below and the attached drawings, in which.

Figure 1:
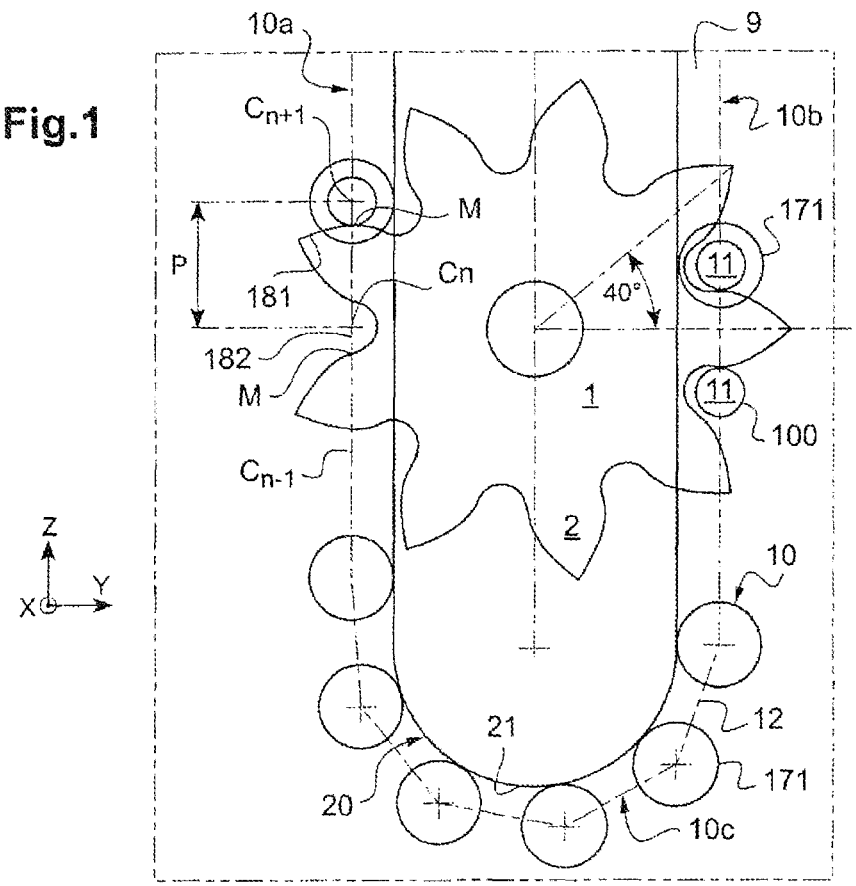
FIG. 1 is a side view of a rigid chain device according to one aspect of the invention.
Figure 2:
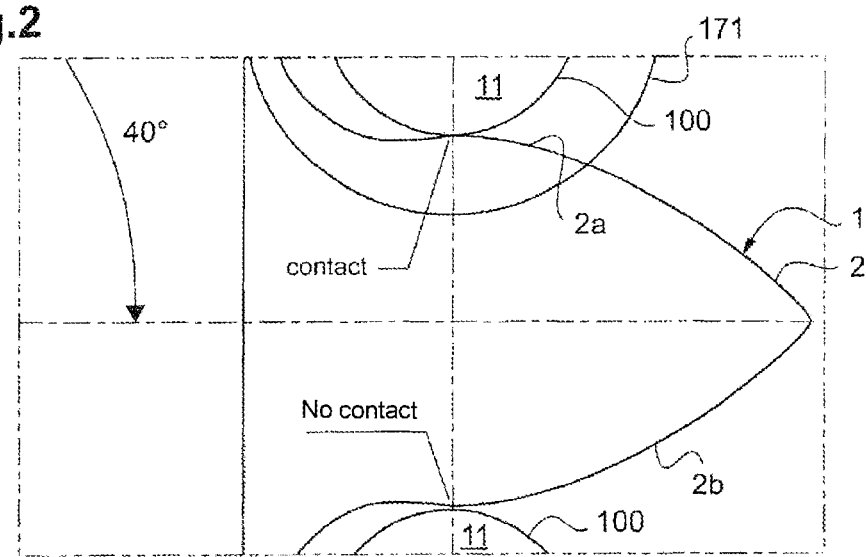
FIGS. 2 to 5 are detailed views of FIG. 1 at angular positions of the sprocket offset successively by 5°.
Figure 3:
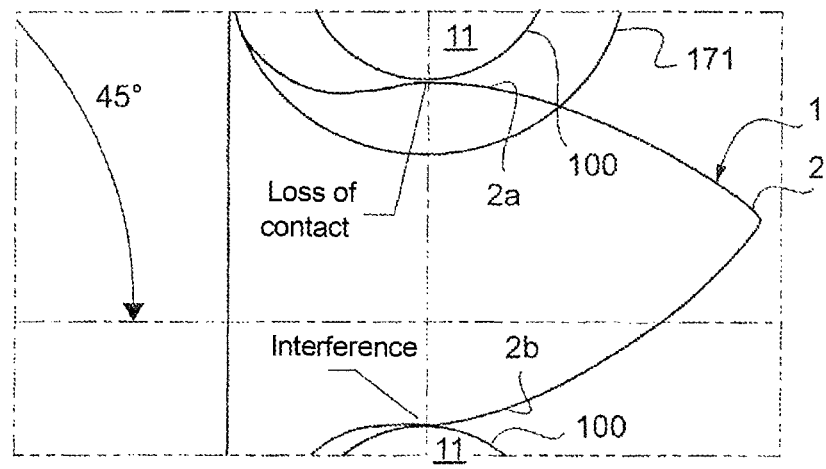
Figure 4:
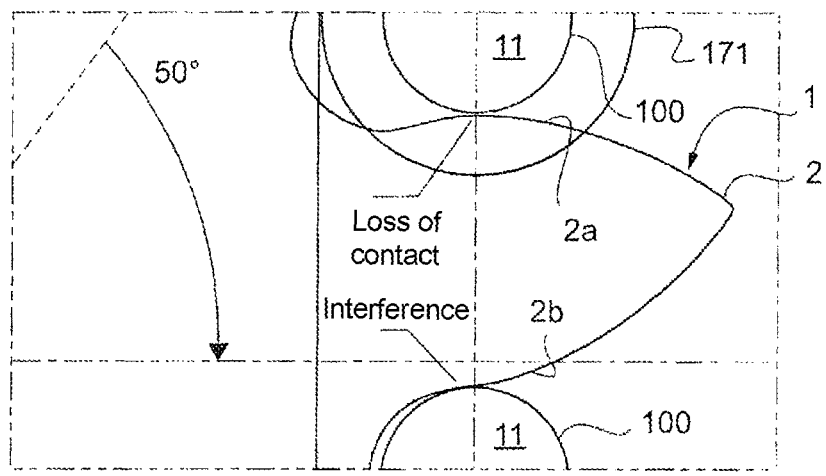
Figure 5:
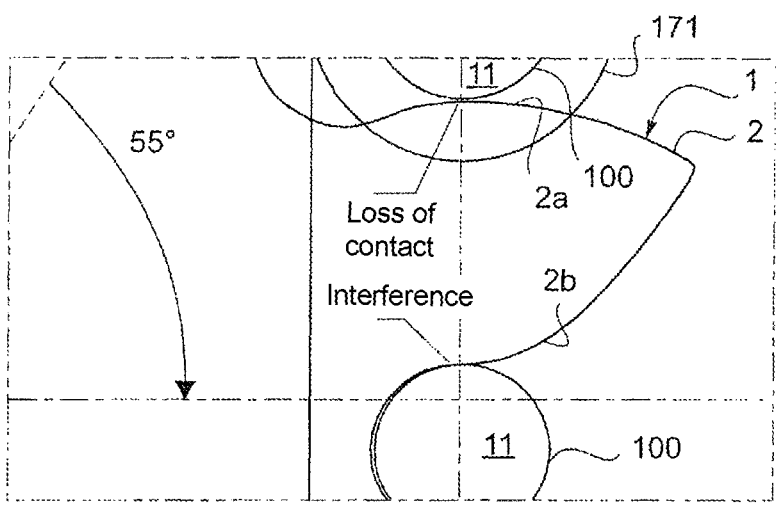
Figure 6:
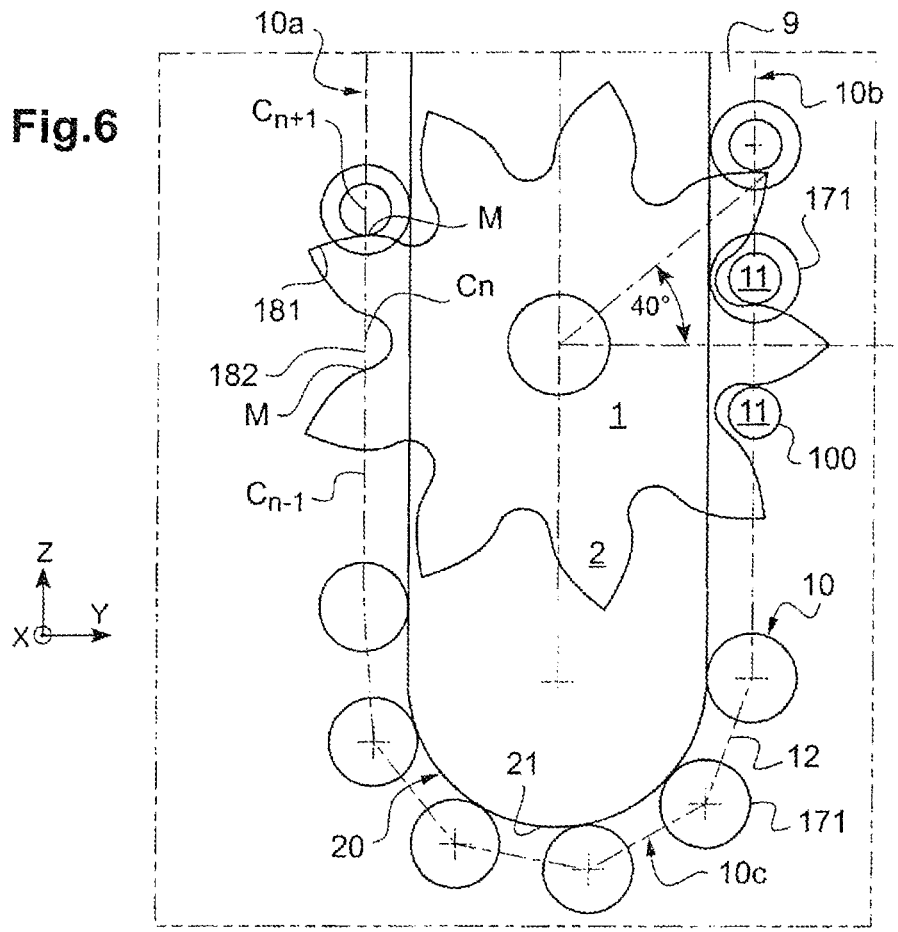
FIG. 6 is a side view of a rigid chain device according to another aspect of the invention.
Figure 7:
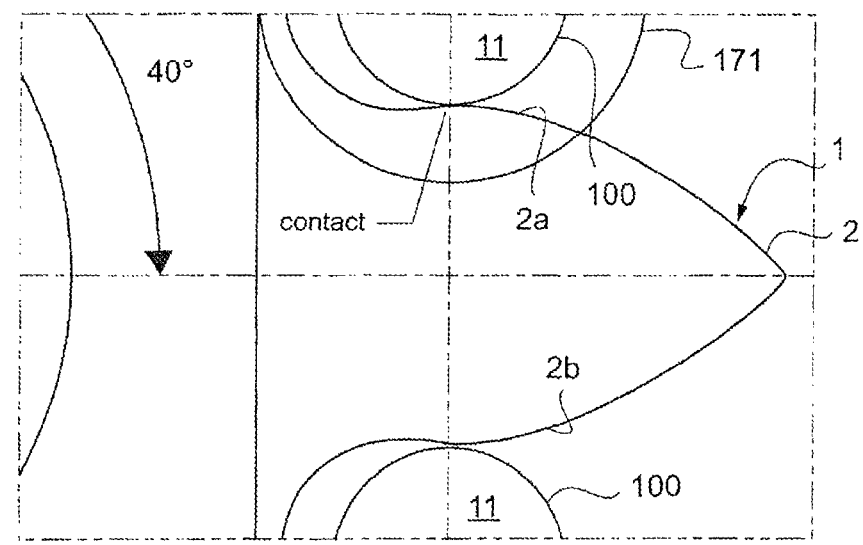
FIGS. 7 to 10 are detailed views of FIG. 6 at angular positions of the sprocket offset successively by 5°.
Figure 8:
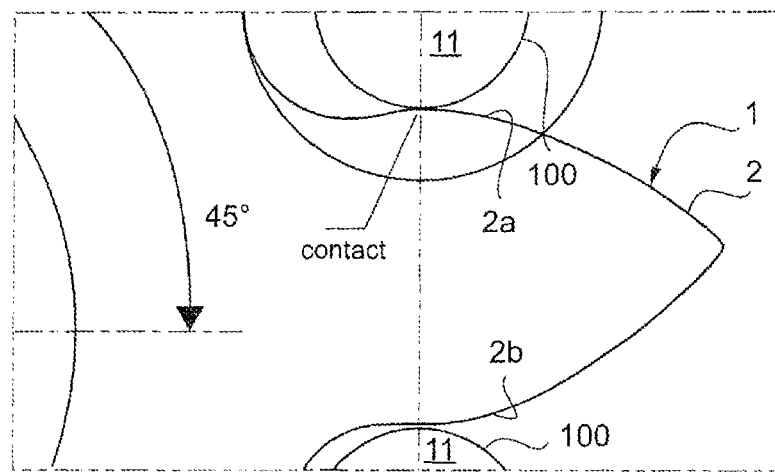
Figure 9:
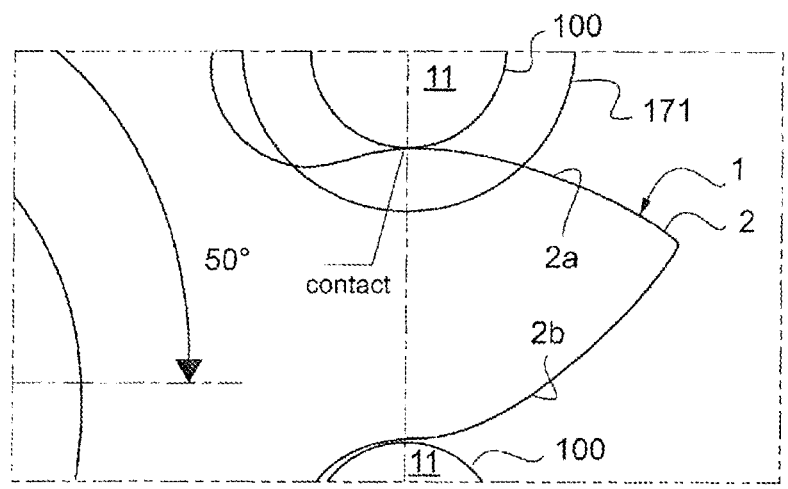
Figure 10:
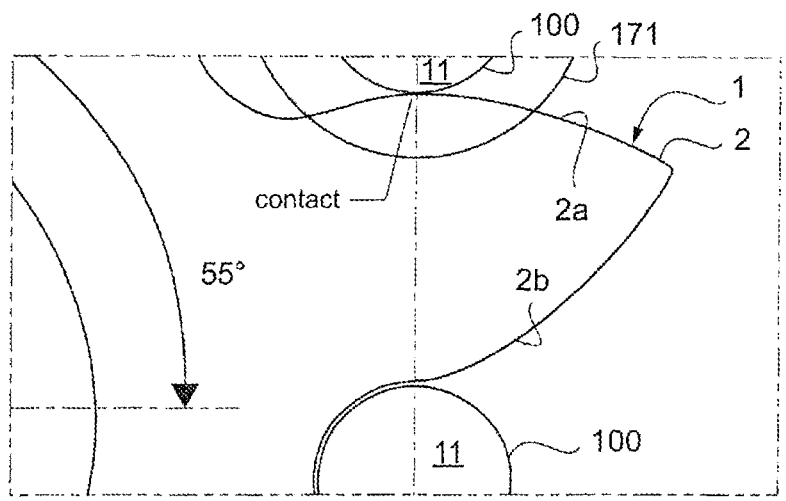

Most of the elements in the drawings and the description are well known, and as such can be used both to better understand the present invention and to contribute to the definition of same, as appropriate.

DETAILED DESCRIPTION

The profile of a sprocket meshing with a chain differs significantly from the profile of two gears meshing together. The chain has bars that are circular straight cylinders in contact with the teeth of the sprocket. The bars are mounted freely to enable them to turn in contact with the sprocket. The diameter of the bar and the center-to-center distance of two consecutive bars are parameters of the chain that affect the sprocket. The sprocket is characterized notably by the number of teeth, the diameter, the opening between two neighboring teeth and the thrust angle. FR 2780472 describes a thrust chain drive comprising a sprocket fitted with idle rollers between two flanges provided with teeth at a ratio of one roller per sprocket tooth. The curved portion of the thrust chain is left free. Thrust is exerted on the axes of the chain in a direction separated from the direction of translational movement of the chain.

For a thrust chain with an unmeshed lower end, the present applicant has identified an additional parameter. In US 2009/0008615, the lower end of the chain is associated with guide sections cooperating with follow bearings projecting laterally from the links to carry and stabilize the chain. However, in a drilling application, noise is a non-limiting parameter, notably since the noise of the other elements very greatly exceeds the noise of a thrust chain.

Conversely, the present applicant is hoping to introduce thrust chains into markets currently using other technologies, for example cables or belts, in residential or office buildings in which vibrations and noise are key parameters.

For this purpose, the thrust chain device includes an open thrust chain. In this case, "open" means a chain with separated ends. The chain has a thrust portion, a housing portion and a connection portion between the thrust portion and the housing portion. The connection portion is arranged away from the sprocket. The device includes a thrust chain guide on a thrust portion of said thrust chain. The guide determines the path of the thrust portion. The thrust portion is usually vertical and the guide absorbs the transverse force, which is usually horizontal. The device includes a driving sprocket with teeth engaged with the thrust chain. The sprocket has one or more rows of teeth. A row comprises teeth positioned in the same plane. The device has a storage space of the housing portion. Said storage space is parallel to the thrust portion and arranged opposite the thrust portion in relation to the axis of rotation of the sprocket.

The driving sprocket engages bilaterally and symmetrically with the thrust chain on the side of said thrust portion and on the side of the housing portion. The mass of the housing portion of the chain transferred to the sprocket reduces the torque required of the motor driving the sprocket. The driving sprocket is in contact with the thrust chain by circular-involute surfaces, said surfaces belonging to the teeth, in which a tooth meshing with the chain defines a line of action having an angle with the thrust portion of between −10° and 10°. Said guide comprises contact surfaces made of synthetic material.

Preferably, the line of action forms an angle of between −2° and 2° with the thrust portion. The forces applied to the guide are low, as a first approximation limited by the sine of the angle above, i.e. less than 3.5% of the thrust force of the chain. The contact surfaces made of synthetic material ensure low friction and negligible wear of the chain, while said contact surfaces are subject to a level of wear compatible with spaced out maintenance visits.

As shown in the figures, a toothed sprocket 1 is mounted rotatably about an axis parallel to the axis X. The circular meshing surfaces 100 belonging to the chain 10 are mounted in translation along an axis Z. In this case, the term "axis" is used in the geometric sense. In the embodiments described above, the circular meshing surfaces 100 correspond to the circular contours of the bars 11 seen in profile. The axis X corresponds to the main direction of the drive shaft 5. The axis Z corresponds to the vertical direction along which the circular meshing surfaces 100 carried by the bars 11 move.

The circular meshing surfaces 100, represented by circles whose centers are referenced $C_{n-1}$, $C_n$, and $C_{n+1}$, are carried directly by the bodies of the bars 11 with no rings or by intermediate members, such as rings, carried by the bodies of the bars 11 and forming drive rollers.

The axis of rotation of the sprocket 1 and the axis of translation of the circular meshing surfaces 100 are orthogonal and separated from one another by a distance d.

During the meshing movement, at least one tooth 2 of the sprocket 1 is in contact with one circular meshing surface 100. Since the teeth 2 are straight and the circular meshing surfaces 100 are moveable orthogonal to the axis X, contact is made on a line extending along the axis X. Seen in the plane shown in the figures, contact can then be shown by a referenced contact point.

In mechanics, one of the most common transmissions of movement involves transforming a rotational movement into another rotational movement. A known transmission involves a first gear wheel with straight teeth and a second gear wheel with straight teeth meshing together to form a straight gear pair for transforming a first rotation into a second rotation. In the literature, this simple type of gear pair is used to define other types of gear pairs. Certain technical terms will be used by analogy to describe the gear pair of the thrust chain.

In this case, the assembly transforms a rotational movement about the axis X into a translational movement along the axis Z. In this, the device has some similarity with a rack-and-pinion gear. However, the circular meshing surfaces 100 differ from the profile of conventional racks. The mesh between the profiles of the teeth 2 on one side and the circular meshing surfaces 100 on the other side therefore provide the gear pair of the device with meshing properties that differ from rack-and-pinion gears. In this case, the bars 11 perform two different functions, specifically:

forming or carrying the circular meshing surfaces 100 that come into contact with the teeth 2 of the sprocket 1, and ensuring a good link between the two plates of a given link, thereby ensuring the stability of the chain.

The sprocket 1 meshes with a rectilinear portion, in this case vertical, referred to as the thrust portion 10a of the chain 10. Consequently, the movement of the bars 11 during meshing is a translational movement. This translational movement distinguishes the gear pair of the chain 10 from conventional systems including a closed chain in which a curved portion is wound about a toothed pulley, in the manner of power train coupling systems or bicycle drive systems. The sprocket 1 also meshes with a rectilinear portion, in this case vertical, referred to as the housing portion 10b of the chain 10. The housing portion 10b is arranged in a storage space 9.

In short, the meshing of the chain 10 is neither like the meshing of a rack nor like the meshing of conventional roller chains.

The combination of the rectilinear movement and the circular profile of the bars 11 affords the meshing of the transmission assembly 1 high performance levels at speed that are particularly suited to rigid chain machinery.

The axis Z is the contact line along which the tangential speed of the sprocket 1 is equal to the linear speed of the circular meshing surfaces 100. Consequently, the distance d separating the contact line and the axis of rotation of the sprocket 1 can be likened to the pitch radius of the sprocket 1 and the contact line at the pitch line of the thrust portion 10a of the chain 10 by analogy with a rack-and-pinion gear. The module m of the sprocket 1 and the module m of the chain 10 are the same. The pitch p of the sprocket 1 and the pitch p of the chain 10 are the same. The pitch p of the sprocket 1 is defined as the length of the arc taken on the pitch circle of the sprocket 1 between two similar points on meshing flanks of two successive teeth. The pitch p and the module m are linked by the following equation: $p=m*\pi$.

When meshing, a contact is established between the meshing flank of the profile of one tooth 2 and the circular meshing surfaces 100. Seen in profile, the contact between two convex surfaces makes it possible to define a tangent shown in the figures by a contact tangent 181. The contact tangent 181 is shown using a dashed line. When meshing, the contact point M moves along a theoretical line known as the line of action and referenced 182. Mechanically, the line of action 182 represents the direction of the forces transmitted from a member meshing with another via the contact point M.

The line of action 182 is substantially perpendicular to the contact tangent 181. In conventional gear pairs with two gear wheels in which the teeth have mating circular-involute profiles, the contact tangent forms an angle $\alpha$ with the direction of the center-to-center distance, i.e. the line linking the centers of each of the two gear wheels. The line of action therefore forms an angle $\alpha \pm \pi/2$ with the direction of the center-to-center distance. The angle $\alpha$ is usually referred to as the pressure angle. The term "pressure angle" is used here.

In rack-and-pinion gears in which the teeth have mating circular-involute profiles, the rack can be likened to a gear wheel of infinite radius. The line extending in the direction of translational movement of the rack and corresponding to the pitch circle of the gear wheel of infinite radius is then referred to as the reference line or pitch line. In this case, the line of action forms an angle $\alpha$ with the reference line. The contact tangent then forms an angle $\alpha \pm \pi/2$ with the reference line. The angle $\alpha$ is also referred to as the pressure angle.

The teeth with mating circular-involute profiles, whether wheel-wheel gears or rack-and-pinion gears, have improved properties compared to the first obstacle transmission system, notably those attributed to Leonardo da Vinci. A first property is to provide substantially homo-kinetic transmission: if the speed of one of the members of the gear pair is constant, then the speed of the other member is also constant. A second property is that the pressure angle $\alpha$ is substantially constant during meshing, notwithstanding machining tolerances and the phenomena of start and end of contact. A third property is facilitating contact by rolling with no slipping between two convex surfaces. The transmission of the movement is therefore satisfactorily continuous and uniform. Furthermore, wear by friction is limited.

To withstand the significant forces and prevent weakening of the rack, teeth with circular-involute profiles are usually truncated. In other words, the radial end of each tooth is capped and the root of the teeth (between two teeth) is not machined to the bottom. Thus, the radial end of the teeth is substantially flat or rounded rather than being acutely pointed, and the root of the teeth has a female shape that is substantially matching, for the same reasons. These adaptations to the mating circular-involute profiles also limit the phenomena of specific slipping and operational interference that occur at the start and end of contact between two mating teeth, also referred to as the approach phase and the recess phase.

The value of the pressure angle is usually set by standards. This value is for example nominally 20° according to European standards and 25° according to US standards. Certain gear pairs, in particular old gear pairs, exceptionally have a value of 14.5°. Setting a standard value also makes it possible to manufacture (machine) gear members such as wheels or racks using a single tool. In other words, designing a gear pair in which the pressure angle $\alpha$ is non-standard would mean designing a dedicated machining tool, which is complex and costly. Finally, gear pairs are usually designed using charts that cross reference a large number of parameters, such as number of teeth, module, etc. These charts are drawn up using a standard pressure angle $\alpha$. Technicians are usually advised not to stray from this.

In the embodiments, the teeth 2 of the sprocket 1 cooperate in operation with the bars with a circular meshing profile. The phenomena of specific slipping and operational interference are in this case avoided, including during the approach and recess phases.

The sprocket 1 for example has between five and fifteen teeth 2. In the examples, the sprocket 1 is a wheel with nine teeth 2. The sprocket 1 is similar in shape to a gear wheel with a circular-involute profile mating with a rack of pitch p. The teeth 2 have a leading flank 2a and a trailing flank 2b. The notion of leading and trailing relates to the force exerted between the sprocket and the chain. The teeth 2 are substantially pointed. The distance d is adjusted so that the pressure angle $\alpha$ at the contact point M is substantially zero. In this case, the distance d is less than the distance corresponding to a standard pressure angle of 20° or 25°. The value of the distance d is chosen as a function of the dimensions of the members, notably of the diameter of the bars 11 and of the pitch p. For example, the pitch p is between 10 and 200 mm. The module m is between 10/$\pi$ mm and 200/$\pi$ mm, i.e. approximately between 3 mm and 64 mm.

The table below shows several example values of distance d, given in millimeters, as a function of the pitch p indicated in millimeters in the left-hand column and the number of teeth indicated in the first line.

diameter of the circular meshing surface 100 is 24 mm, the diameter of the guide rollers is 60 mm and the pitch is 60 mm. The half-distance between the two straight portions of the guide 20 is 85.944 mm.

The gear pair shown, comprising the teeth 2 of the sprocket 1 and the mating circular meshing surface 100, therefore has a substantially zero pressure angle $\alpha$. In other words, the line of action 182 forms a substantially zero angle with the direction of translational movement of a thrust portion 10a of the chain 10. The line of action 182 is substantially parallel to the axis Z. The contact tangent 181 forms a substantially right angle ($\alpha \pm \pi/2$) with the direction of translational movement of the thrust portion 10a of the chain 10. In practice and in consideration of machining tolerances, the angle is less than 5° in absolute terms.

In variants, the pressure angle $\alpha$ has an absolute value less than the aforementioned standard values, but greater than 0. For example, The pressure Angle $\alpha$ Can be between −10° and 10°, or between −5° and 5°, between −2° and 2°, or between −1° and 1°. The contact tangent 181 then forms an angle ($\alpha \pm \pi/2$) with the direction of translational movement of the thrust portion 10a of the chain 10 of between 80° and 100°, between 85° and 95°, between 88° and 92°, between 89° and 91° respectively.

In the examples shown, the space between the circular meshing surface 100 carried by the bars 11 is free. There is no "root" linking one outer bar 11 to another. The movement of the teeth 2 of the sprocket 1 during the meshing movement is free.

In this case, where the sprocket 1 has a small number of teeth 2, the radial end of the teeth 2 is machined to be pointed. The radial end of the teeth 2 is not capped. Where the sprocket 1 has a large number of teeth 2, the teeth are capped. This helps to limit the number of simultaneous contacts, thereby reducing vibrations and spurious noise. Furthermore, when the contact point $M_{n+1}$ approaches the end of a tooth $2_{n+1}$, shown at the top in the figures, a new contact point $M_n$ is established between the pairing of the tooth $2_n$ and the following circular meshing surface $100_n$, and so forth. The force is then transmitted by the new pairing $2_n/100_n$ before the contact point $M_{n+1}$ is highly stressed.

In the example shown, the roots of the teeth 2 of the sprocket 1 are machined to a substantially circular profile with a diameter equal to or greater than the diameter of the circular meshing surfaces 100. Thus, notwithstanding machining tolerances, each circular meshing surface 100 is seated in a root between two teeth 2 before being driven by the downstream tooth 2.

|   | Number of teeth = | | | | | | |
| --- | --- | --- | --- | --- | --- | --- | --- |
|   | 5 | 6 | 8 | 9 | 10 | 12 | 15 |
| p = 20 mm | 15.915 | 19.099 | 25.465 | 28.648 | 31.831 | 38.197 | 47.746 |
| p = 30 mm | 23.873 | 28.648 | 38.197 | 42.972 | 47.746 | 57.296 | 71.620 |
| p = 40 mm | 31.831 | 38.197 | 50.930 | 57.296 | 63.662 | 76.394 | 95.493 |
| p = 50 mm | 39.789 | 47.746 | 63.662 | 71.620 | 79.577 | 95.493 | 119.366 |
| p = 60 mm | 47.746 | 57.296 | 76.394 | 85.944 | 95.493 | 114.592 | 143.239 |
| p = 80 mm | 63.662 | 76.394 | 101.859 | 114.592 | 127.324 | 152.789 | 190.986 |
| p = 90 mm | 71.620 | 85.944 | 114.592 | 128.916 | 143.239 | 171.887 | 214.859 |
| p = 100 mm | 79.577 | 95.493 | 127.324 | 143.239 | 159.155 | 190.986 | 238.732 |

The combinations of values proposed are example embodiments of the invention. These combinations correspond to a pressure angle $\alpha$ whose absolute value is close to zero. In the embodiment shown in FIGS. 1 to 10, the In the examples described here, the bars 11 are mounted idly in relation to the links 12 of the chain 10. This facilitates the rolling of the outer bar 11 against the meshing surface of the tooth 1 when meshing. Friction is reduced. The wear of the bars 11 and of the teeth 1 is reduced. In a variant, the bars 11 are mounted static in relation to one of the two links 12 connected by the bars. In this case and where contact is made directly on a circular meshing surface 100 that is prevented from rotating, slipping phenomena occur during meshing. The manufacture of the chain 10 can nonetheless be facilitated. For example, a link 12 and an outer bar 11 can be formed as a single part or welded together.

The device as described above makes it possible to considerably reduce the radial forces generated in the gear pair. The radial forces are mainly oriented in the direction y. This helps to further stabilize the chain 10 when in movement and to reduce the vibrations transmitted to the chain 10 by the sprocket 1, in particular at high speeds. Consequently, the quantity of noise and the noise levels in operation are also reduced compared to known installations. Such performance is in particular appreciable in applications intended for machinery such as personal elevators and freight elevators used in the entertainment industry, such as at theaters, music halls and operas. This performance is also appreciable in facilitating personal mobility, at home or at healthcare establishments.

Reducing the radial forces generated in the chain 10 in operation also reduces the composite stresses applied to the parts making up the transmission assembly 1. The force transmitted from the sprocket 1 to the bars 11 is mainly oriented in the direction of translational movement of the chain 10. The tangential component is increased while the radial component is rendered negligible. The transmission ratio is therefore close to 100%. Thus, the guide members opposing movement of the chain 10 in a radial direction are less stressed than in the known systems. The guide members such as brackets can then be made from materials having lesser mechanical strength properties than the metal normally used. For example, plastic materials such as polyurethane or polyethylene can be used while retaining a low risk of breaking during operation. This makes it possible not only to provide savings in raw materials, but also to limit metal-metal contact. Noise, in particular rattling, is also reduced.

Henceforth, the terms front, rear, top, bottom, left and right are used in the relative sense. In the figures, a three-dimensional reference system is shown: x is the lateral direction oriented from left to right, y is the depthwise direction oriented from front to back, and z is the vertical direction oriented from bottom to top. Since the chain is a substantially linear member, the terms head and tail are used to identify the two ends.

The main operating principles, and notably the kinematics of the machinery, are described in FR 2786476, which the reader is invited to consult.

The chain 10 has a thrust portion 10a and a housing portion 10b, which are parallel. The thrust portion 10a and the housing portion 10b are linked by a curved connection portion 10c. The thrust portion 10a is carried by the teeth 2 of the sprocket 1 on one side and the housing portion 10b is carried by the teeth 2 of the sprocket 1 on the side diametrically opposite. The connection portion 10c forms a 180° curve beneath the sprocket 1. The connection portion 10c is carried by the thrust portion 10a and the housing portion 10b. The sprocket 1 meshes with the thrust portion 10a of the chain 10 from the inner side thereof in relation to the connection portion 10c. The sprocket 1 meshes with the housing portion 10b from the inner side thereof in relation to the connection portion 10c.

The chain 10 includes links 12. The links 12 are articulated with one another to form the chain 10. The chain 10 used in the device forms a movement transmission member.

Henceforth, the links 12 are identified by the number 1 to N from the tail link $12_1$ to the head link $12_N$ carrying a coupling plate. The number n refers to a link $12_n$ or the part of a link $12_n$. For example, the reference sign $121_n$ refers to one of the plates $121_n$ of the link $12_n$. In this context, the term link should be understood to refer to the basic mechanical pattern that is reproduced identically along the chain 10. The link $12_n$ is connected to a link $12_{n-1}$ on one side and to a link $12_{n+1}$ on the other side, where 1<n<N.

During elevation, i.e. clockwise rotation of the sprocket 1, a link $12_n$ belongs successively to the housing portion 10b, the connection portion 10c, then the thrust portion 10a of the chain 10, and inversely during descent.

The device also has a stationary guide 20. The guide 20 forms a rolling surface for the guide rollers 171 described below. The guide 20 can be a part forming a rolling surface made of a low-wear synthetic material, such as polyurethane or polyamide. The guide 20 has a first straight portion corresponding to the thrust portion 10a, a second straight portion corresponding to the housing portion 10b and a curved portion corresponding to the connection portion 10c. The guide 20 offers a rolling surface oriented outwards, the curved portion being convex. The curved portion is connected to the first straight portion at one end and the second straight portion at the other end smoothly, in other words without any specific point of divergence. The curved portion forms a return member 21. In the embodiments shown in FIGS. 1 to 5, the curved portion is a half circle with a constant radius.

In order to further improve performance, the present applicant has carried out tests on the profiles of the curve portion of the guide 20. The chain 10 and the sprocket 1 have very tight machining tolerances to reduce wear and noise. The meshing on the side of the housing portion 10b was studied to look for specific sources of noise. For a nine-toothed sprocket with one tooth positioned at 40° to the horizontal plane XY with the following tooth at 0°, there is contact with the leading flank 2a or upstream flank of the following tooth and no contact with the trailing or downstream flank 2b. This situation is considered to be normal. It has been discovered that for the positions at 45°, 50° and 55°, shown respectively in FIGS. 3, 4 and 5, contact with the leading flank 2a of the following tooth is lost and contact is reestablished with the downstream or trailing flank 2b. Noise is generated when contact is reestablished.

Conversely, continuity of the contact surface is sought. In the embodiments shown in FIGS. 6 to 10, the curved portion is of non-constant radius despite extending over 180°. The curved portion is symmetrical about the plane XZ. The curved portion comprises two identical quadrants, thereby simplifying manufacture. Each quadrant is symmetrical about a plane at 45° to the plane XZ and parallel to the axis X. Each quadrant has an upper rectilinear zone extending the first straight portion or the second straight portion, a lower rectilinear zone extending the lower rectilinear zone of the other quadrant and located in the plane XY, and a rounded zone between the upper rectilinear zone and the lower rectilinear zone.

The curved portion can have two circular arc portions of the same radius with offset centers. Said centers can be horizontally separated from one another. The radius may be less than the radius in the embodiment in FIGS. 1 to 5. The radius may be less than half of the distance between the two upper rectilinear zones. The two circular arc portions can be linked by a lower rectilinear zone, notably smaller.

The rounded zone has a radius that is greater than half of the distance between the first and second straight portions, in which the center is considered to be the point located at the intersection of a line normal to the upper rectilinear zone and secant at the end of the upper rectilinear zone and a line normal to the lower rectilinear zone and secant at the end of the lower rectilinear zone. With reference to the guide 20 as a whole and for the sake of comparison, the theoretical center is placed in the plane of symmetry XZ of the guide 20 at a distance from the lower rectilinear zones that is equal to half of the distance between the first and second straight portions. The curved portion is close to a circular involute, for example by quadrant. The rounded zone is built geometrically about an imaginary sprocket identical to the actual sprocket 1 arranged at the bottom of the connection portion.

The position of the chain 10 is shown in FIGS. 7 to 10 for angles of the sprocket 1 of 40°, 45°, 50° and 55°. At each of these angles, there is contact with the leading flank 2a of the following tooth and no contact with the trailing flank 2b. Contact is therefore constant over at least the 15° excursion shown. In practice, contact is constant on the leading flank over an angle of 40°. More generally, contact is constant over 360°/number of teeth.

When the sprocket 1 is rotating counterclockwise, the chain 10 is pushed towards the housing by each of the teeth 2 in contact with the chain 10. When the sprocket 1 is rotating clockwise, the chain 10 pushes each of the teeth 2 in contact with the chain 10. There is contact at the start of the mesh and a loss of contact at the end of the mesh, the thrust portion 10a being loaded.

Figure 11:
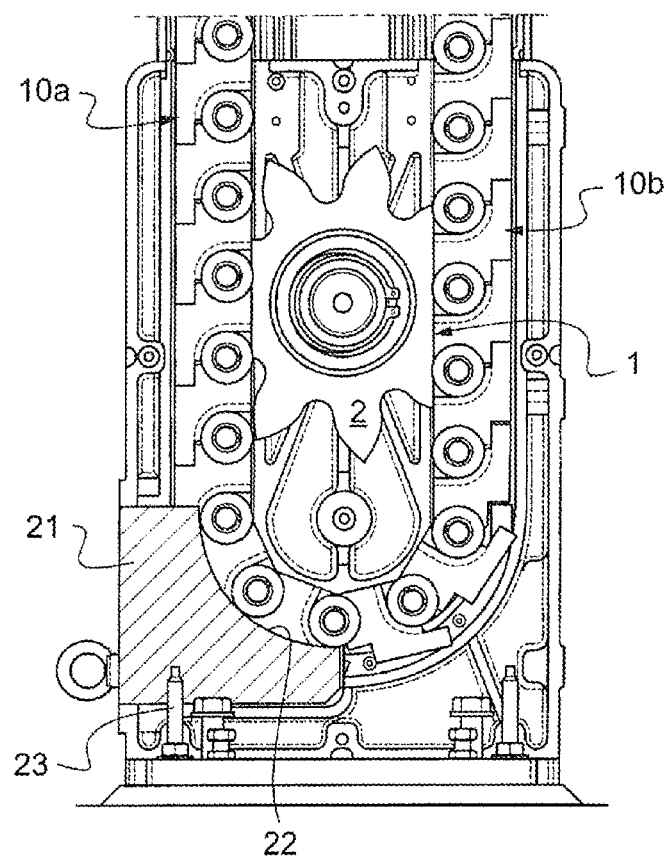
FIG. 11 is a side view of a rigid chain device according to another aspect of the invention.

In the embodiment in FIG. 11, the return member 21 is a part with a convex rolling surface 22 for the guide rollers 171. The return member 21 has been omitted from the right-hand side of the figure in order to show the chain more fully. The return member 21 is thin in the direction x so as not to hinder the path of the links of the chain. The convex rolling surface 22 has a variable radius by analogy with FIG. 6. The convex rolling surface 22 can be static or moveable. If moveable, a pusher 23 is provided in the direction z. The pusher 23 can be elastic. The pusher 23 exerts a compressive force on the chain 10.

The chain 10 can be of the type described in FR 2780472, which the reader is invited to consult.

Figure 12:
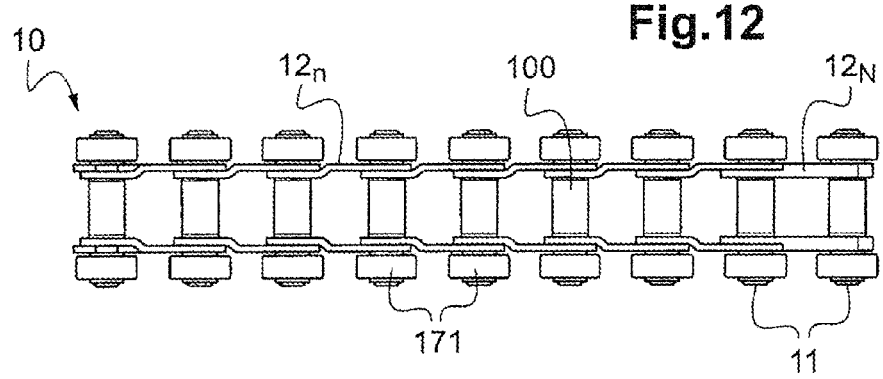
FIGS. 12 and 13 are perspective top views of a rigid chain according to one aspect of the invention.
Figure 13:
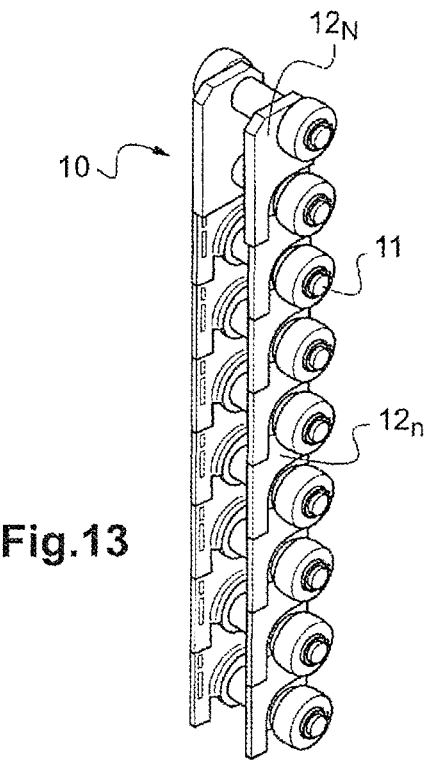

In the embodiment shown in FIGS. 11 to 13, the chain 10 has a plurality of successive links 12. The links 12 are articulated about bars 11 forming transverse pins. Each link 12 has two essentially parallel surfaces 12a. Each surface 12a is perforated by two holes for receiving the joint pins. Each surface 12a is provided with an extension 12b defining a transverse active front face and a transverse active rear face to bear respectively against a transverse active rear face of a surface 12a of a front link and a transverse active front face of a surface of a rear link when the links 12 are in a straight line, notably inside the thrust portion of the chain 10. Each surface 12a has an upstream portion and a downstream portion that are transversely offset. The offset can be provided in the press. The upstream portion and the downstream portion are parallel. The upstream portion and the extension 12b are located in the same plane. The downstream portion is offset towards the inside of the link. The downstream portion is beside the upstream portion of another link 12 articulated on the same bar 11.

Each joint pin of the links 12 is provided with guide rollers 171 at the ends thereof. The guide rollers 171 are positioned outside the surfaces. The guide rollers 171 cooperate with the lateral guide rails provided on the lateral flanges of a casing forming part of the guide 20 in the housing and thrust portions, and with the return member 21 in the connection portion.

Figure 14:
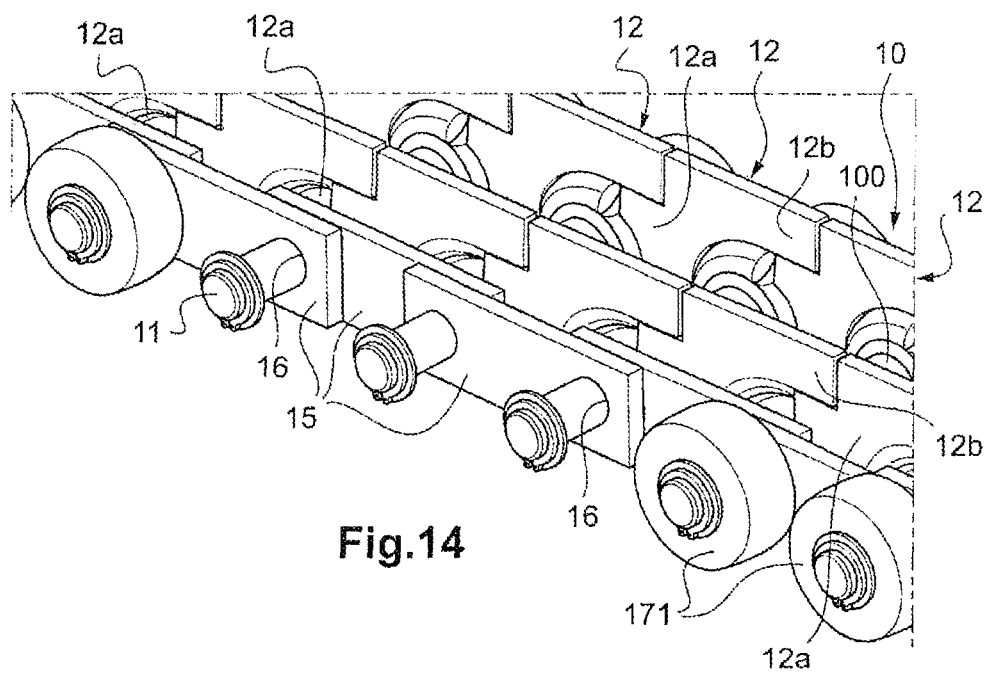
FIG. 14 is a perspective view of a rigid chain according to one aspect of the invention.

In the embodiment shown in FIG. 14, the chain 10 also has elastic tensioners 15. Three guide rollers 171 have been omitted to show the elastic tensioners 15. The elastic tensioners 15 help to eliminate the play between links 12. The elastic tensioners 15 are made of a flexible material, for example polyurethane. Each elastic tensioner 15 is a one-piece part. Each tensioner 15 has three holes 16 designed to receive the bars 11 forming the joint pins. Each tensioner 15 is a parallelepiped having a thickness similar to the thickness of a link 12. The length of a tensioner 15 is less than the length of a link 12 to prevent contact between two coplanar tensioners. The height of a tensioner 15 is less than the height of a link 12, the tensioner 15 having no extension. Each tensioner 15 is mounted on two neighboring bars 11. Each tensioner 15 is mounted on the ends of the bars 11 beyond the links 12. An even-numbered tensioner and an odd-numbered tensioner are mounted on the first end of a bar 11 and, on the other side, an even-numbered tensioner and an odd-numbered tensioner are mounted on the second end of the same bar 11, opposite the first end.

The odd-numbered tensioners are coplanar. The even-numbered tensioners are coplanar in a plane parallel to the plane of the odd-numbered tensioners. The odd-numbered tensioners are in contact with the surfaces of two successive links 12. The even-numbered tensioners are in contact with the odd-numbered tensioners. The odd-numbered tensioners are between the links 12 and the even-numbered tensioners. The even-numbered tensioners are between the odd-numbered tensioners and the guide rollers 171.

The transmission assembly can be a module or an assembly kit in separate parts. For example, two identical chassis fitted with identical drives can be compatible with housings and/or chains of different lengths. A kits can include several optional chains or links that can be added or removed.

The invention is not limited to the transmission assemblies and machinery described above, which are provided purely by way of example, but encompasses all of the variants that could be envisaged by the person skilled in the art.

The invention claimed is:

1. A thrust chain device, comprising an open thrust chain comprising
   a thrust portion and a housing portion,
   a thrust chain guide on a thrust portion of the thrust chain,
   a driving sprocket provided with teeth engaged with the thrust chain, and
   a storage space of the housing portion,
   wherein the storage space is parallel to the thrust portion and located opposite the thrust portion, the driving sprocket engages bilaterally with the thrust chain in a symmetric manner on the side of the thrust portion and on the side of the housing portion, the chain comprising a connection portion between the thrust portion and the housing portion, arranged at a distance from the sprocket, the driving sprocket being in contact with the thrust chain by circular-involute surfaces, the surfaces belonging to the teeth, one tooth meshing with the chain while defining a line of action having an angle with the thrust portion between −10° and 10°, and the guide comprising contact surfaces made of a synthetic material,
   wherein the connection portion is guided by a return member, and the return member is approximately an involute of a circle.

2. The device as claimed in claim 1, wherein the contact surfaces are rolling surfaces or sliding surfaces.

3. The device as claimed in claim 1, wherein there is only one driving sprocket.

4. The device as claimed in claim 1, wherein at least one of the thrust portion and the housing portion is arranged above the driving sprocket, and the connection portion is arranged beneath the sprocket.

5. The device as claimed in claim 1, wherein the return member is static.

6. The device as claimed in claim 1, wherein the position of the return member is adjustable.

7. The device as claimed in claim 1, wherein the return member includes a tensioner.

8. The device as claimed in claim 1, wherein the return member includes a compressing member.

9. The device as claimed in claim 1, wherein the sprocket has between 5 and 15 teeth with circular-involute profiles, mounted rotatably about an axis, and the chain has bars, at least one of the bars being engaged with the sprocket, and the sprocket has straight teeth with a module m of between 3 and 64 mm.

10. The device as claimed in claim 1, wherein the chain has a pre-tensioned elastic member.

11. The device as claimed in claim 1, wherein the line of action forms an angle of between −2° and 2° with the thrust portion.

12. A thrust chain device, comprising an open thrust chain comprising
a thrust portion and a housing portion,
a thrust chain guide on a thrust portion of the thrust chain,
a driving sprocket provided with teeth engaged with the thrust chain, and
a storage space of the housing portion,
wherein the storage space is parallel to the thrust portion and located opposite thrust portion, the driving sprocket engages bilaterally with the thrust chain in a symmetric manner on the side of the thrust portion and on the side of the housing portion, the chain comprising a connection portion between the thrust portion and the housing portion, arranged at a distance from the sprocket, the driving sprocket being in contact one tooth meshing with the chain while defining a line of action having an angle with the thrust portion between −10° and 10°, and the guide comprising contact surfaces made of a synthetic material; and
wherein the guide has a first straight portion corresponding to the thrust portion, a second straight portion corresponding to the housing portion and a curved portion corresponding to the connection portion, and offers a rolling surface oriented outwards, the curved portion being convex, the curved portion being smoothly connected to the first straight portion at one end and to the second straight portion at the other end, the curved portion forming a return member, the curved portion having a non-constant radius and extending over 180°.

13. The device as claimed in claim 12, in which the curved portion is symmetrical about the plane passing through the axis of the driving sprocket and the axis of the thrust portion and is made up of four identical quadrants, each quadrant is symmetrical about a plane at 45° to the plane passing through the axis of the driving sprocket and the axis of the thrust portion and parallel to the axis of the thrust portion, each quadrant having an upper rectilinear zone that extends the first straight portion or the second straight portion, a lower rectilinear zone that extends the lower rectilinear zone of the other quadrant and is in the plane passing through the axis of the driving sprocket and normal to the axis of the thrust portion, and a rounded zone between the upper rectilinear zone and the lower rectilinear zone.

14. The device as claimed in claim 13, in which the curved portion has two circular arc portions of the same radius with offset centers, separated horizontally from one another, the radius being less than half of the distance between the two upper rectilinear zones.

15. The device as claimed in claim 13, in which the guide forms a rolling surface for guide rollers.

16. The device as claimed in claim 12, in which the curved portion includes a plurality of circular arc portions, the portions being tangents.

* * * * *